April 23, 1957 L. W. CRUMP 2,789,409
PORTABLE CROPPING MACHINE FOR TREE-FRUITS
Filed Nov. 23, 1955 2 Sheets-Sheet 1
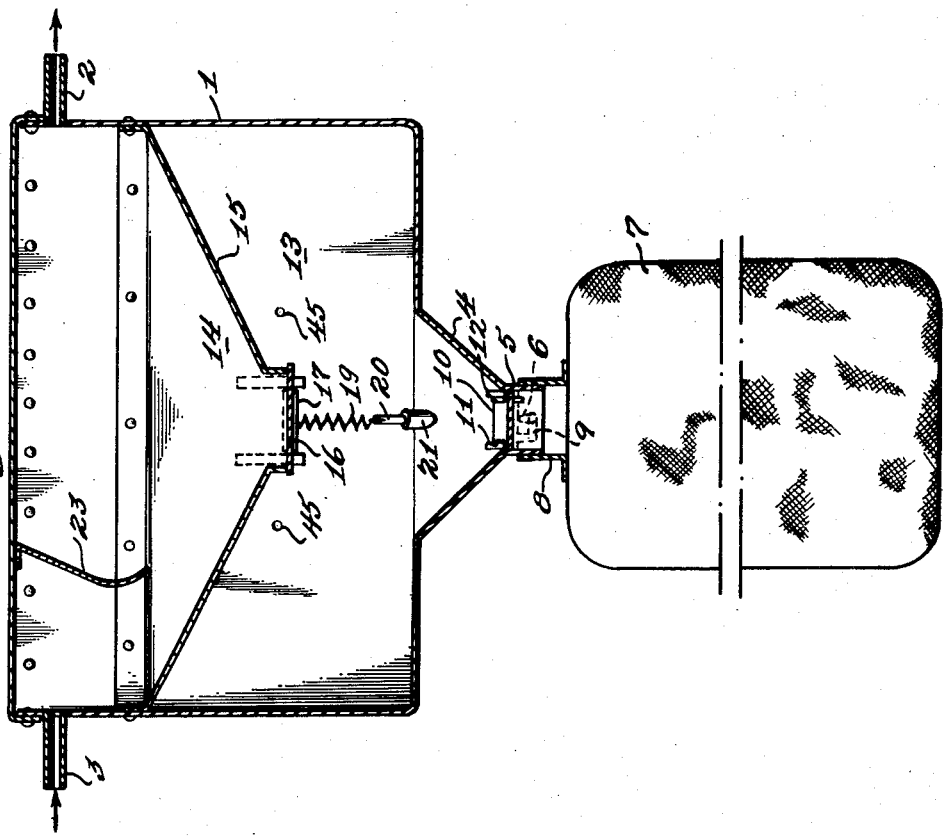
INVENTOR
LUIS W. CRUMP
BY Young, Emery + Thompson
ATTORNEYS

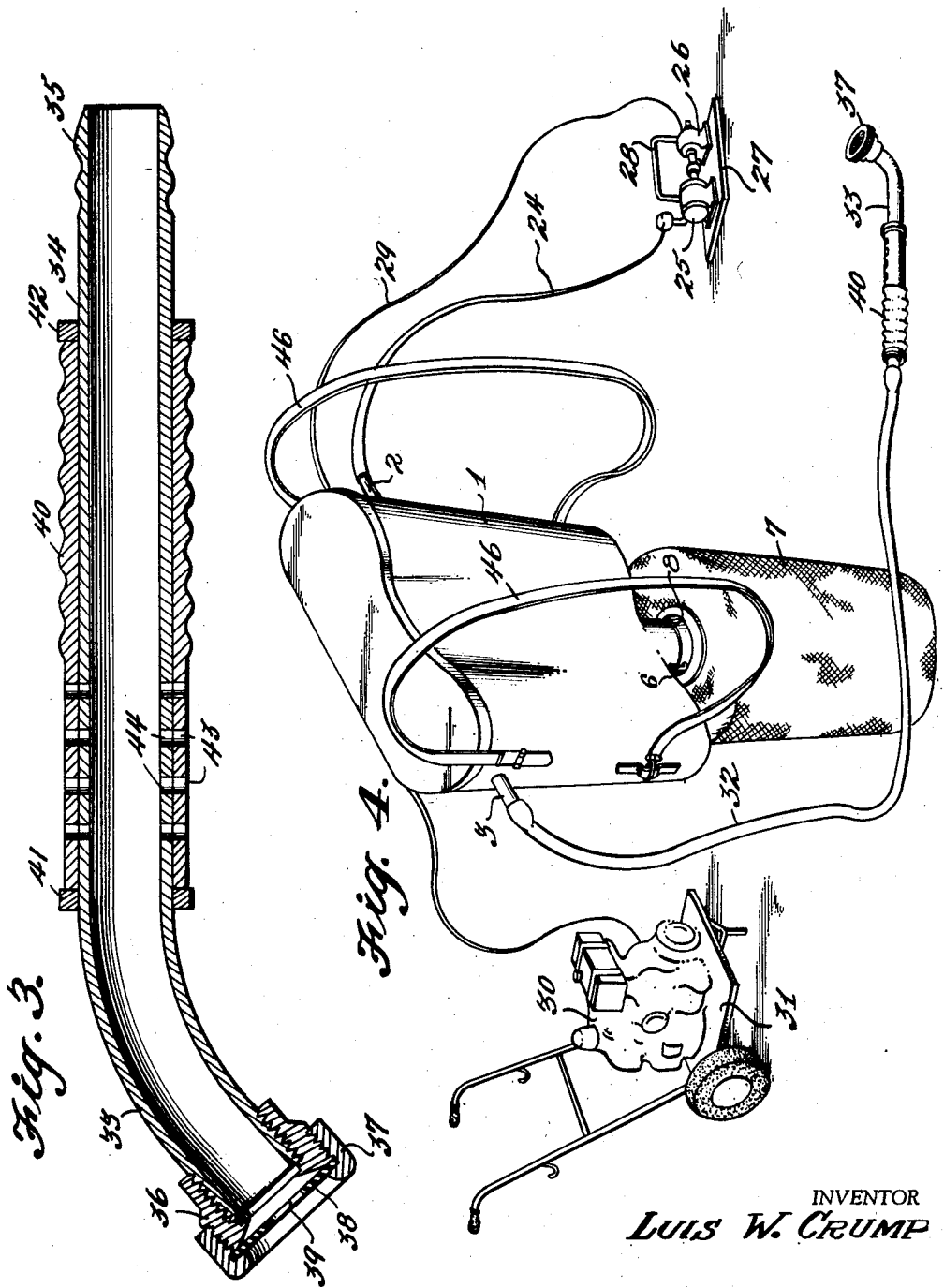

United States Patent Office 2,789,409
Patented Apr. 23, 1957

2,789,409

PORTABLE CROPPING MACHINE FOR TREE-FRUITS

Luis W. Crump, Bogota, Colombia

Application November 23, 1955, Serial No. 548,658

4 Claims. (Cl. 56—330)

This invention relates to machines for harvesting all kinds of fruits by means of suction whereby the work is more efficient as a result of eliminating or reducing manual labor with resulting saving in time and reduction of loss of fruits or grains so that the cost of the product is reduced.

An object of this invention is to provide a pneumatic harvester or picker of coffee berries which can easily be carried on the shoulder of the worker while he is manipulating the nozzle of the vacuum or suction picking device proper.

Another object of this invention is to provide a small portable electric generating plant of variable power output, a portable electric motor driven vacuum pump, capable of producing a vacuum up to one atmosphere but of variable capacity, and the vacuum collecting or harvesting device proper comprising a collecting tank which can be attached to the shoulders of the worker by means of straps, and a suction fruit picking tube or nozzle.

A further object of this invention is to provide a vacuum coffee berry picker in which the degree of suction can be adjusted to selectively pick ripe berries.

Although the following description and the drawings relate to a device for picking coffee berries it is to be understood that the invention can be applied to the picking of any other fruits such as apples, pears, oranges, figs by merely varying the size and dimensions of the suction nozzle to adapt it to the size of the fruits to be picked without exceeding the scope of the invention.

In the drawings:

Figure 1 is a vertical sectional view of the collecting chamber;

Fig. 2 is a sectional view taken on line 2—2 of Fig. 1;

Fig. 3 is a longitudinal axial sectional view of the suction tube nozzle for picking the fruit;

Fig. 4 is a perspective view of the complete machine and equipment.

As shown in Figs. 1 and 2, the apparatus of the present invention comprises a collecting tank 1. This tank is of closed construction but has an air discharge tube or nipple 2 to which a suction hose is connected and an intake tube or nipple 3 to which a fruit picking hose is connected. The bottom of tank 1 is in the form of a hopper 4 having a discharge fitting 5 at its lower end provided with pins or other attaching means 6 for the attachment of a bag 7 or other suitable receptacle.

As shown the bag or receptacle is secured to a tubular collar 8 having bayonet slots 9 provided therein adapted to cooperate with pins 6 to enable the collar 8 to be detachably secured to the fitting 5. In place of the receptacle 7 and the collar 8, an ordinary bag or sack can be merely hung on the pins 6 which are in the form of hooks.

The upper portion of the fitting 5 is provided with a closure 10 mounted to swing about a hinge 11 between closed and opened positions. A spring 12 is associated with closure 10 urging it to a closed position.

Tank or container 1 is divided into a lower compartment 13 and an upper compartment 14 by a hopper-like partition 15 the edges of which are tightly secured to the side walls of tank 1. The top of the tank is similarly secured to the side walls of the tank 1. As shown the hopper-like partition 15 has an opening in its lower central portion which is closed by a closure member 16 hinged about a horizontal axis 17. Closure 16 is provided with a rear extension 18 which is connected by a tension spring 19 to an adjustable rod 20 axially slidable in a socket 21 extending through and fixed to the wall of hopper 4 as shown. The outer end of rod 20 is threaded to receive a knurled nut 22 by means of which the rod 20 may be axially shifted to vary the tension of spring 19.

A baffle 23 depends from the top of the tank 1 and extends across the tank to intercept any coffee berries entrained in the current of air drawn through the tank 1. Upon impinging the baffle 23 the berries or other fruit will drop onto the partition and move towards the center thereof onto the closure member or valve 16. The tank 1, partition 15, baffle 23 and closures or valves 10 and 16 may be constructed of metal, plastic or other suitable material.

As best shown in Fig. 4 the tank 1 is connected by a hose 24 of a suitable length to the intake of a vacuum pump 25 which is driven by an electric motor 26. The pump may be of the type having an eccentric rotor with radially sliding blades or of any other suitable type. Pump 25 and its driving motor 26 are mounted on a portable support 27 provided with a carrying member 28.

The electric motor 26 may be connected by means of suitable flexible conductor housed in the motor cord 29 to any suitable supply of electric current. When the apparatus is employed in locations where electric current is not available a portable engine driven generator 30 may be employed and mounted on a suitable conveyance 31 whereby it can be moved about.

Again referring to Fig. 4 it will be noted that the intake nipple 3 of tank 1 is connected by a flexible hose 32 to a collecting nozzle 33. As best shown in Fig. 3 nozzle 33 comprises a tube 34 formed at one end as a nipple 35 to receive hose 32. Tube 34 is curved adjacent its other end and at the extremity of this end is externally threaded to receive a bushing 36 which is externally threaded to receive an annular flanged retaining member 37. Between the flange of member 37 and the bushing 36 is positioned a disc 38 having a central opening 39 therein. The removable flanged member 37 enables the disc 38 to be easily replaced by another disc having an opening therein of different size.

A sleeve 40 is rotatably mounted on tube 34 between two collars 41 and 42 fixed to the tube. Sleeve 40 and tube 34 are each provided with openings 43 and 44 which may be brought into and out of register to vary the amount of air drawn through the same and thereby vary the degree of suction at the orifice 39 of disc 38, the more air drawn through openings 43 and 44 the less will be drawn through aperture 39. This is of particular importance in that by proper regulation of the sleeve 40 ripe coffee berries can be picked whereas green berries will not be sucked into the nozzle, the adherence of green berries to the stems of the plant being greater than the adherence of ripe berries. Tube 34 and sleeve 40 may be constructed of metal or other suitable material.

As coffee berries or other fruit to be picked are drawn into the nozzle 33 and entrained by the air passing through the nozzle and tube 32 they are discharged into the tank 1 where they strike baffle 23 and fall into the hopper provided by partition 15.

When the weight of the coffee berries or other fruit reaches a predetermined value in the compartment 14, the valve or closure 16 opens against the suction effect and the effect of spring 19 urging the valve 16 closed, and drops the berries into the lower compartment 13, where they collect in hopper 4. Following discharge from compartment 14 the valve 16 is closed by spring 19. After valve or closure 16 is closed then valve or closure 10 can open and the picked fruit can drop through fitting 5 into bag 7. When bag 7 is full it may be removed and replaced by a new bag.

In some instances it may be desired to provide openings 45 in the wall of compartment 13 so that this compartment is vented to the atmosphere to prevent creation of a vacuum in this compartment.

As indicated in Fig. 4 the tank 1 with attached bag 7 may be provided with shoulder straps 46 to enable the device to be carried on the back of a picker.

The nozzle or at least a portion thereof may be made of transparent material to enable the operator to see what is passed into the nozzle.

While a single tank 1 has been shown connected to the vacuum pump it is contemplated to provide for the connection of a plurality of tanks 1 with associated gathering nozzles to a single source of vacuum, or a plurality of tanks 1 with associated nozzles and vacuum pumps to a single source of electric power.

Having described my invention, I claim:

1. In an apparatus for picking coffee berries and other fruit having a vacuum pump, means for driving said vacuum pump, transmission means interconnecting the pump and driving means, a nozzle adapted to be placed in contact with the fruit to be picked, flexible conduit means connecting said nozzle to the vacuum pump, a collecting tank interposed in the flexible conduit between the nozzle and said vacuum pump, the improvement in which the suction nozzle comprising a tube formed at one end as a nipple to receive said flexible conduit means, said tube being curved adjacent its other end, said other end having its external surface threaded, an internally and externally threaded bushing threadedly mounted on the threaded end of the tube, an annular flanged retaining member internally threaded and removably threadedly mounted on the bushing, a disc having a central opening therein, said disc being positioned between the flange of said retaining member and said bushing, said removable flanged member enabling said disc to be easily replaced by another disc having an opening therein of different size, two collars fixed on the outer surface of the tube, a sleeve rotatably mounted on said tube between said collars, said sleeve and tube being provided with openings which may be brought into and out of register to vary the amount of air drawn through the same and thereby vary the degree of suction at the central opening of said disc, said tube and sleeve being constructed of a suitably hard and resistant material.

2. A suction nozzle as claimed in claim 1, in which the material of which said tube and sleeve are made is a transparent material which enables the operator to see what is passed into the nozzle.

3. In an apparatus for picking coffee berries and other fruit having a vacuum pump, means for driving said vacuum pump, transmission means interconnecting the pump and driving means, a nozzle adapted to be placed in contact with the fruit to be picked, flexible conduit means connecting said nozzle to the vacuum pump, a collecting tank interposed in the flexible conduit between the nozzle and said vacuum pump, the improvement in which the collecting tank comprises a vessel having an upper wall, side walls and a bottom having a discharge fitting, a hopper-like partition dividing the tank into upper and lower compartments, and provided at its bottom with an opening at the central portion thereof for discharge of fruit from the upper into the lower compartments, a closure member hingedly mounted on the partition for closing said discharge opening, a spring connected to said closure urging the same to closed position, a baffle in said vessel extending downwardly from the upper wall thereof between opposite side walls of the vessel to a position above the partition, and a nipple in each of said opposite side walls at a position between the upper wall and the lower end of the baffle for connecting portions of the flexible conduit means to the tank.

4. A collecting tank as claimed in claim 3, in which the closure member is hinged about a horizontal axis and is provided with a rear extension, a tension spring connected at one end to the extension and at its other end to an adjustable rod axially slidable in a fixed socket, the outer surface of the other end of said rod being threaded to be engaged in said fixed socket, said lower end of the rod being provided with a knurled nut externally attached thereto by means of said said rod may be axially adjusted to vary the tension of said spring.

References Cited in the file of this patent
UNITED STATES PATENTS

| | | |
|---|---|---|
| 851,475 | Albert | Apr. 23, 1907 |
| 1,139,492 | Creekmore | May 18, 1915 |
| 1,305,960 | Boig | June 3, 1919 |
| 1,335,035 | Taylor | Mar. 30, 1920 |
| 2,471,326 | Hoyt | May 24, 1949 |